United States Patent
Wong et al.

(10) Patent No.: US 10,949,756 B2
(45) Date of Patent: Mar. 16, 2021

(54) SYSTEM AND METHOD FOR CREATING AND SELECTIVELY MODIFYING CHARACTERS AND CONDITIONALLY PRESENTING CUSTOMIZED CHARACTERS VIA ELECTRONIC CHANNELS

(71) Applicant: Binary Bubbles, Inc., Palos Verdes Peninsula, CA (US)

(72) Inventors: Lisa Gai-Tzen Wong, North Hollywood, CA (US); Amit Tishler, North Hollywood, CA (US); Richard Paul Weeks, Plymouth (GB)

(73) Assignee: Binary Bubbles, Inc., North Hollywood, CA (US)

( * ) Notice: Subject to any disclaimer, the term of this patent is extended or adjusted under 35 U.S.C. 154(b) by 466 days.

(21) Appl. No.: 15/886,074

(22) Filed: Feb. 1, 2018

(65) Prior Publication Data

US 2019/0236461 A1 Aug. 1, 2019

(51) Int. Cl.
*G06N 5/02* (2006.01)
*G06Q 30/08* (2012.01)
*G06N 20/00* (2019.01)

(52) U.S. Cl.
CPC ............. *G06N 5/025* (2013.01); *G06N 20/00* (2019.01); *G06Q 30/08* (2013.01)

(58) Field of Classification Search
CPC ......... G06N 5/025; G06N 20/00; G06Q 30/08
See application file for complete search history.

(56) References Cited

U.S. PATENT DOCUMENTS

| 5,680,531 | A  | 10/1997 | Litwinowicz |               |
|-----------|----|---------|-------------|---------------|
| 7,025,675 | B2 | 4/2006  | Fogel       |               |
| 7,249,139 | B2 | 7/2007  | Chuah       |               |
| 2002/0090985 | A1 | 7/2002 | Tochner    |               |
| 2004/0225715 | A1* | 11/2004 | Gottfried | G06Q 50/01 709/204 |
| 2005/0251553 | A1* | 11/2005 | Gottfried | G06Q 30/06 709/204 |
| 2007/0021200 | A1 | 1/2007 | Fox         |               |

(Continued)

FOREIGN PATENT DOCUMENTS

EP 0902383 A2 3/1999

*Primary Examiner* — Tadesse Hailu
(74) *Attorney, Agent, or Firm* — Sheppard Mullin Richter & Hampton LLP

(57) ABSTRACT

A system and method of creating electronic characters in one or more electronic formats, selectively customizing the characters, and presenting them via electronic channels in response to satisfaction of one or more programmable conditions is disclosed. The system enables entities to competitively bid to customize the personality and/or other attribute of a character. For example, a character may be presented via an electronic channel to an audience (e.g., one or more end users who view, listen to, or otherwise experience a character through an electronic channel). An entity may bid on altering that character's personality and/or other attribute. If the entity's bid is selected by the system (e.g., over other bids that also compete to alter one or more attributes of that character), the system customizes the character's personality and/or other attribute according to the winning bid's customization, and presents the customized character via the electronic channel to the audience.

21 Claims, 10 Drawing Sheets

(56) References Cited

U.S. PATENT DOCUMENTS

| | | | |
|---|---|---|---|
| 2007/0143679 A1 | 6/2007 | Resner | |
| 2009/0235364 A1* | 9/2009 | Cohen | H04N 21/8402 726/28 |
| 2009/0281884 A1* | 11/2009 | Selinger | G06Q 30/0631 705/14.4 |
| 2009/0281895 A1* | 11/2009 | Selinger | G06Q 30/0246 705/14.43 |
| 2009/0281923 A1* | 11/2009 | Selinger | G06Q 30/00 705/26.1 |
| 2009/0281973 A1* | 11/2009 | Selinger | G06Q 30/02 706/14 |
| 2010/0083139 A1 | 4/2010 | Dawson | |
| 2010/0289738 A1 | 11/2010 | Schoonover | |
| 2010/0293026 A1* | 11/2010 | Vojnovic | G06Q 99/00 705/7.13 |
| 2011/0261071 A1 | 10/2011 | Ganetakos | |
| 2014/0125678 A1 | 5/2014 | Wang | |
| 2014/0337174 A1 | 11/2014 | Lin | |
| 2015/0286276 A1 | 10/2015 | Harrell, Jr. | |
| 2015/0363849 A1* | 12/2015 | As | G06Q 30/0611 705/26.4 |
| 2016/0110595 A1 | 4/2016 | Wang | |
| 2016/0314311 A1 | 10/2016 | Jiang | |
| 2016/0358365 A1 | 12/2016 | Sumner | |
| 2017/0249972 A1* | 8/2017 | Oguchi | G11B 27/031 |
| 2017/0351653 A1* | 12/2017 | Ramlet | G06F 40/58 |
| 2019/0130436 A1* | 5/2019 | Ma | G06N 20/00 |
| 2019/0317735 A1* | 10/2019 | Duan | G06F 8/61 |

* cited by examiner

SYSTEM AND METHOD FOR CREATING AND SELECTIVELY MODIFYING CHARACTERS AND CONDITIONALLY PRESENTING CUSTOMIZED CHARACTERS VIA ELECTRONIC CHANNELS

FIELD OF THE INVENTION

The invention relates to a system and method of creating electronic characters, selectively modifying the characters, and presenting them via electronic channels in response to satisfaction of specified conditions.

BACKGROUND OF THE INVENTION

Developing and customizing characters for instantiation via electronic channels can be a time consuming process. For instance, programming conditions under which a character should be presented via an electronic channel can be cumbersome and overly integrated with existing solutions. Furthermore, making characters perform specific actions in response to satisfaction of specified conditions in specific electronic channels and formats can be a time consuming and challenging process. To the extent a character owned by a first party is subject to intellectual property rights owned by that party, others may find it challenging to customize and use that character for presentation in various channels and formats.

These and other drawbacks exist with existing technology and conventional ways to programmatically instantiate customized characters via electronic channels.

SUMMARY OF THE INVENTION

The invention addressing these and other drawbacks relates to a system and method of creating electronic characters in one or more electronic formats, selectively customizing the characters, and presenting them via electronic channels in response to satisfaction of one or more programmable conditions. The system enables entities to competitively bid to customize the personality and/or other attribute of a character. For example, a character may be presented via an electronic channel to an audience (e.g., one or more end users who view, listen to, or otherwise experience a character through an electronic channel). An entity may bid on altering that character's personality and/or other attribute. If the entity's bid is selected by the system (e.g., over other bids that also compete to alter one or more attributes of that character), the system customizes the character's personality and/or other attribute according to the winning bid's customization and presents the customized character via the electronic channel to the audience.

In some instances, a character may already be presented to an audience via an electronic channel and the winning bid's customizations is applied to alter the personality and/or other attributes of the character that is already presented to the audience. In other instances, a character is not already presented to an audience and the winning bid's customizations may be applied to a character to alter the personality and/or other attribute of the character, which is then presented to the audience (i.e., the character is not already presented to the audience before the customization is applied). In either of the foregoing instances, entities (such as advertisers or others) may competitively bid to win the ability to alter the personality and/or other attribute of characters that are presented to an audience via an electronic channel.

A character (referred to interchangeably herein as "Character" or electronic character) may be any digital asset having one or more customizable attributes that may be presented via an electronic channel. For example, a Character may include an electronic representation of a person (e.g., an actor, celebrity, etc.), a chatbot (in which a personality of the chatbot and/or other chatbot characteristic such as automated chat messages can be customized), an electronic object, a logo, a phrase, a name, audio, and/or other thing that may be represented (using one or more electronic formats including visually, audibly or otherwise) via one or more electronic channels.

A Character's customizable attributes may include, without limitation, a personality (e.g., animations, expressions, voice and/or other attributes), an appearance (e.g., realistic, cartoonish, etc., as defined by a three-dimensional model such as a Filmbox (FBX) file, a Computer Aided Design file such as a Drawing Exchange Format (DXF) file, or an image file such as a Portable Network Graphics (PNG) file), a behavior, a mood (e.g., happy, sad, angry, etc.), content that the Character presents (e.g., a message, a video, audio, a call to action, and/or other content), audio (e.g., speech, music, audible sound, etc., via an audio file or algorithmically generated audio which may be a voice), and/or other attribute of a Character. Each of the attributes (other than an appearance attribute) may be associated with a corresponding appearance specified in an appearance attribute. For example, the "happy" mood attribute and/or a "jumping" behavior attribute may be associated with a corresponding appearance as defined by a corresponding appearance attribute. A Character in which one or more attributes have been modified (including modification or addition of content to present) will be referred herein as a "Customized Character."

An electronic channel (referred to interchangeably herein as "Channel") includes any medium configured to provide or otherwise convey Characters visually, audibly, and/or through other formats. For example, and without limitation, a Channel can include electronic devices configured to: (i) output an augmented reality display, a virtual reality display, a mixed reality display, a two-dimensional electronic display, a holographic or other three-dimensional display, and/or other visual displays; (ii) output audio; and/or (iii) otherwise output electronic data in one or more electronic formats.

The system may cause one or more Customized Characters to be presented via Channels in response to satisfaction of one or more conditions. For example, the system may manage the presentation (also referred to herein interchangeably as instantiation) of the Customized Characters through the Channels via computer commands that control algorithms that specify actions or other attributes of the Character in response to the satisfaction of programmable conditions. The system may also include a technology platform, responsive to user input via a computer-generated user interface, that manages the conditions and customizations, including the creation and storage of rules that determine which entity gets to control the presentation of a character and the actions that the Character performs and/or other presented attributes, in response to certain programmable conditions. In other words, when a programmable condition is satisfied, one or more customizations may be applied to a Character for presentation to an audience. Based on the customizations and conditions, the system may generate one or more customization rules for the Character. As such, the customization rules may specify when a Character and/or customization for the Character should be presented and therefore how the character should be presented via a Channel.

Examples of programmable conditions may include, without limitation, detection of the presence of a user device at a physical geolocation of the user device (based on on-board GPS or other location sensors), a movement or speed of the user device (based on gyroscopic or other motion sensors), a virtual world state (e.g., of a game or other media playing at the user device), other state of the user device, detection of media being played in an environment or surrounding of the user device (e.g., video, audio, videogame) being played external to the user device, an event detected by the user device (e.g., the device is present at a sporting or other event as determined through visual recognition of images from a camera using conventional image recognition techniques), an object, graphics or text detected in an environment of the user device, an ambient condition detected by the user device, and/or other state of the environment or surrounding of the user device.

In a particular implementation, a character may be programmed with a personality and serve as an agent for taking an action (including delivering specific messages) when one or more conditions have been satisfied. The actions and/or messages may be updated via a remote user interface. In this manner, the system enables entities to compete by submitting offers to have specified characters take certain actions or deliver certain messages in response to satisfaction of a specified set of conditions. The system may create a set of rules to determine which actions/messages should be selected in the event of competing offers. This enables different entities to interact with an end user, such that the end user is presented with different characters and different actions/messages via a common electronic channel in response to satisfaction of specified conditions.

A Character may be provided by a character provider for customization by others (such as character customizers) using the system. The customizations can include computer algorithms which drive custom attributes of the Character. For example, a customization may include a customized personality of a Character to enable the Character to execute certain actions in response to satisfaction of conditions in which the actions and conditions may be defined within the system, enabled by the algorithm, and selected by users via a computer-generated user interface that provides input for the algorithm.

In some instances, the system may receive permission (e.g., legal permission for relevant intellectual property) from the character provider to use the Character. Upon receipt of the character attributes, the system may assign the Character with a character identifier (which may be system-generated and/or provided by the character provider) and store the character attributes in association with the character identifier. In some instances, a character provider may specify that any customization must be approved by the character provider. In these instances, the system may store a flag or other indication in association with the character identifier that indicates that such approval is necessary. As such, before implementing any of the customizations, the system may determine whether the flag that indicates customization approval is required is set. If the flag is set, the system may provide the customizations to the character provider for approval. If an approval indication is received from the character provider, then the system may implement the customizations and present the relevant Customized Character. If not, the system will not implement the customizations and inform the character customizer of the non-approval.

In some implementations, the system may provide electronic tools to create a new Character to create an all-new character this is not based on a pre-existing graphic, image, audio, gesture/behavior, and/or text (other than character templates as described below). In this manner, character providers and others may design and generate new characters on-the-fly using the system, and others may customize and instantiate the new characters. In some implementations, the system may access an electronic library of character templates that include one or more attributes of a character that can be modified to create a new character. The new character may then be selected, customized, and bid on for presentation to an audience by others.

In some implementations, the audience (e.g., end users operating or otherwise having control over a Channel) may select one or more Characters to appear, either persistently, on-demand, and/or responsive to satisfaction of conditions. In these implementations, the end user may control whether and when a Character is instantiated on the Channel.

The system may obtain and store content for presentation with a Customized Character and/or content that is to act as a condition. Such content may be provided by the character provider, the character customizer, from a media provider such as a streaming media platform, and/or other source from which content may be obtained. In this manner, the technical solution enables use of diverse content from diverse sources.

The content may include media (e.g., videos, images, audio, etc.), tactile information (e.g., haptic output), and/or other types of content that can be presented with or serve as a condition for customizations to a Character to be presented. In some instances, the content may be stored so that a content customizer may specify one or more times of playback of the content that a Customized Character should be presented or otherwise appear. In some instances, the one or more times may be tied to specific custom behaviors. For example, the content customizer may specify that a Customized Character should be presented via a Channel when a video playback is at the one minute mark. Additionally, the content customizer may specify that the Customized Character should exhibit a certain behavior at the two minute mark. In this way, the content customizer may specify specific behaviors or other character attributes that should occur in association with content obtained and stored by the system.

The computer system may enable the use of campaigns through a campaign module. The campaign module may generate a campaign based on campaign parameters input by a character customizer (or other system user). A campaign may include a discreet set of one or more Customized Characters to be presented in association with one or more conditions described herein. In other words, during a campaign, one or more Characters (some or all of which may be customized) may be presented for instantiation on a Channel (in some cases if one or more condition have been satisfied).

A given campaign may be executed by the system when a campaign initiating event occurs. A campaign initiating event may include an indication from a user to start the campaign, when a predefined time period has elapsed, when the current date meets or exceeds a start date, and/or other configurable time or event. The campaign may be executed until canceled or may expire upon satisfaction of a campaign terminating event. A campaign terminating event may include a predefined time period has elapsed, when the current date meets or exceeds an end date, when a certain number of characters have been instantiated in association with the campaign, and/or other configurable time or event.

The campaign parameters may specify certain conditions that must be met in order for a Character to be instantiated in a Channel. For campaigns with more than one Character to be instantiated, the conditions may apply to all the Characters. Alternatively, some conditions may apply to some of the Characters while other conditions may apply to other Characters. For example, one Character of a campaign may include a company logo while another Character includes a company product. The company logo and the company product characters may be instantiated when a given condition is satisfied. Alternatively or additionally, the company logo character may be instantiated when one condition is satisfied while the company product character may be instantiated when another condition is satisfied. In this manner, the campaign designer (usually but not necessarily a character customizer) may flexibly configure a campaign with multiple characters.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION OF THE INVENTION

The invention described herein relates to a system and method of creating Characters in one or more electronic formats, selectively customizing the Characters, and presenting them via Channels in response to satisfaction of one or more programmable conditions, according to an implementation of the invention. The system enables entities to competitively bid to customize the personality and/or other attribute of a Character. For example, a Character may be presented via a Channel to an audience. An entity may bid on altering that Character's personality and/or other attribute. If the entity's bid is selected by the system (e.g., over other bids that also compete to alter one or more attributes of that Character), the system customizes the Character's personality and/or other attribute according to the winning bid's customization, and presents the Customized Character via the Channel to the audience.

Typically, though not necessarily, a Character may be associated with ownership rights such as intellectual property rights. For example, and without limitation, a Character may represent a logo that is protected by trademark or copyright, the rights of which may be owned by an entity such as a character provider. As such, a character provider may use the system to allow customization and propagation of the character provider's Character via instantiation on a Channel. As used herein, a character will be described as being owned by a character provider when in fact the underlying thing represented by the Character (e.g., a logo) is owned by the character provider. The Character itself may be a digital representation, which is used by the system to be customized and instantiated in a Channel. Of course, permission to use the Character (where necessary) may be provided to the system by the character provider.

Exemplary System Architecture

Figure 1:
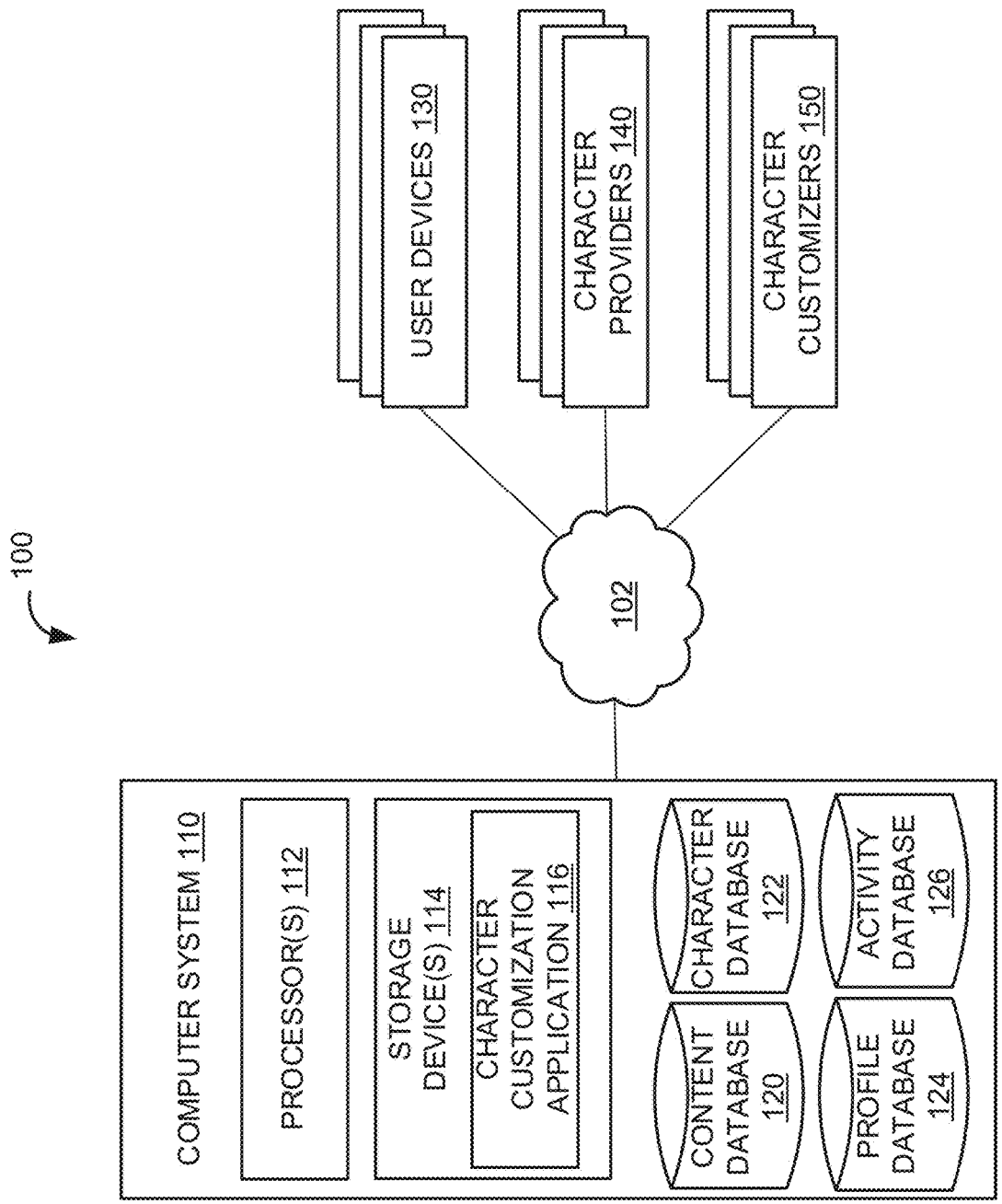
FIG. 1 illustrates a system for creating electronic characters, selectively modifying the characters, and presenting them via electronic channels in response to satisfaction of specified conditions, according to an implementation of the invention.

FIG. 1 illustrates a system 100 for creating electronic characters, selectively modifying the characters, and presenting them via electronic channels in response to satisfaction of specified conditions, according to an implementation of the invention. In one implementation, system 100 may include a computer system 110, a plurality of user devices 130, a plurality of character providers 140, a plurality of character customizers 150, and/or other components.

Computer System 110

Computer system 110 may be configured as a server (e.g., having one or more server blades, processors, etc.), a gaming console, a handheld gaming device, a personal computer (e.g., a desktop computer, a laptop computer, etc.), a smartphone, a tablet computing device, and/or other device that can be programmed for creating customized characters and selectively displaying in a Channel.

Computer system 110 may include one or more processors 112 (also interchangeably referred to herein as processors 112, processor(s) 112, or processor 112 for convenience), one or more storage devices 114 (which may store a character customization application 116, a content database 120, a character database 122, a profile database 124, and an activity database 126), and/or other components. Processors 112 may be programmed by one or more computer program instructions. For example, processors 112 may be programmed by character customization application 116, and/or other instructions.

User Devices 130

User device 130 may be configured as a wearable device (e.g., a virtual reality or augmented reality headset/glasses), a gaming console, a handheld gaming device, a personal computer (e.g., a desktop computer, a laptop computer, etc.), a smartphone, a tablet computing device, and/or other device that can be programmed to provide customized characters through an electronic interface, such as an augmented, mixed, virtual reality, or other type of display interface that can present the character. Although not illustrated in FIG. 1, user devices 130 may include one or more physical processors programmed by computer program instructions. An user device 130 is one example of a Channel. Other types of Channels may be used as well so long as they can present a Character as described herein, such as electronic billboard ads, television display screens, holographic projectors, and others. As such, the functionality and description of user devices 130 may be applied to other types of Channels as well.

In operation, user devices 130 may be programmed by a rendering agent 132, which may instantiate a virtual world, depict an augmented or mixed reality display, and/or provide other types of electronic interfaces. The rendering agent 132 may be provided with trigger rules to independently cause appropriate characters to be instantiated in the electronic display. In some instances, the rendering agent 132 may be configured as a standalone application of an augmented, mixed, or virtual reality device (or other type of user device). Alternatively, the rendering agent 132 may be embedded as part of another application, such as a video game application that interfaces with computer system 110 to instantiate characters in-game (whether the game is a virtual world video game, a mixed reality video game, or an augmented reality video game). In these instances, third party video game or other media providers may provide in-game or in-content characters obtained from computer system 110. It should be noted that the rendering agent 132 may perform some or all of the functions of the character customization application 116. Likewise, the character customization application 116 may perform some or all of the functions of rendering agent 132. As such, the character customization application 116 and the rendering agent 132 may work cooperatively together (or alone) to create, customize, and store characters, as well as assess whether conditions have been satisfied and instantiate customized characters on a Channel if the conditions have been satisfied.

Character Providers 140

A character provider 140 may include an entity that owns rights to a Character. The character provider 140 may provide the system with attributes of the Character.

Character Customizers 150

A character customizer 150 may include an entity that customizes a Character, which may be owned by another entity such as a character provider 140. In some instances, a character customizer 150 may act as an agent of a character provider 140. For example, a character customizer 150 may act on behalf of a character provider 140 to customize a Character owned by the character provider 140.

Figure 2:
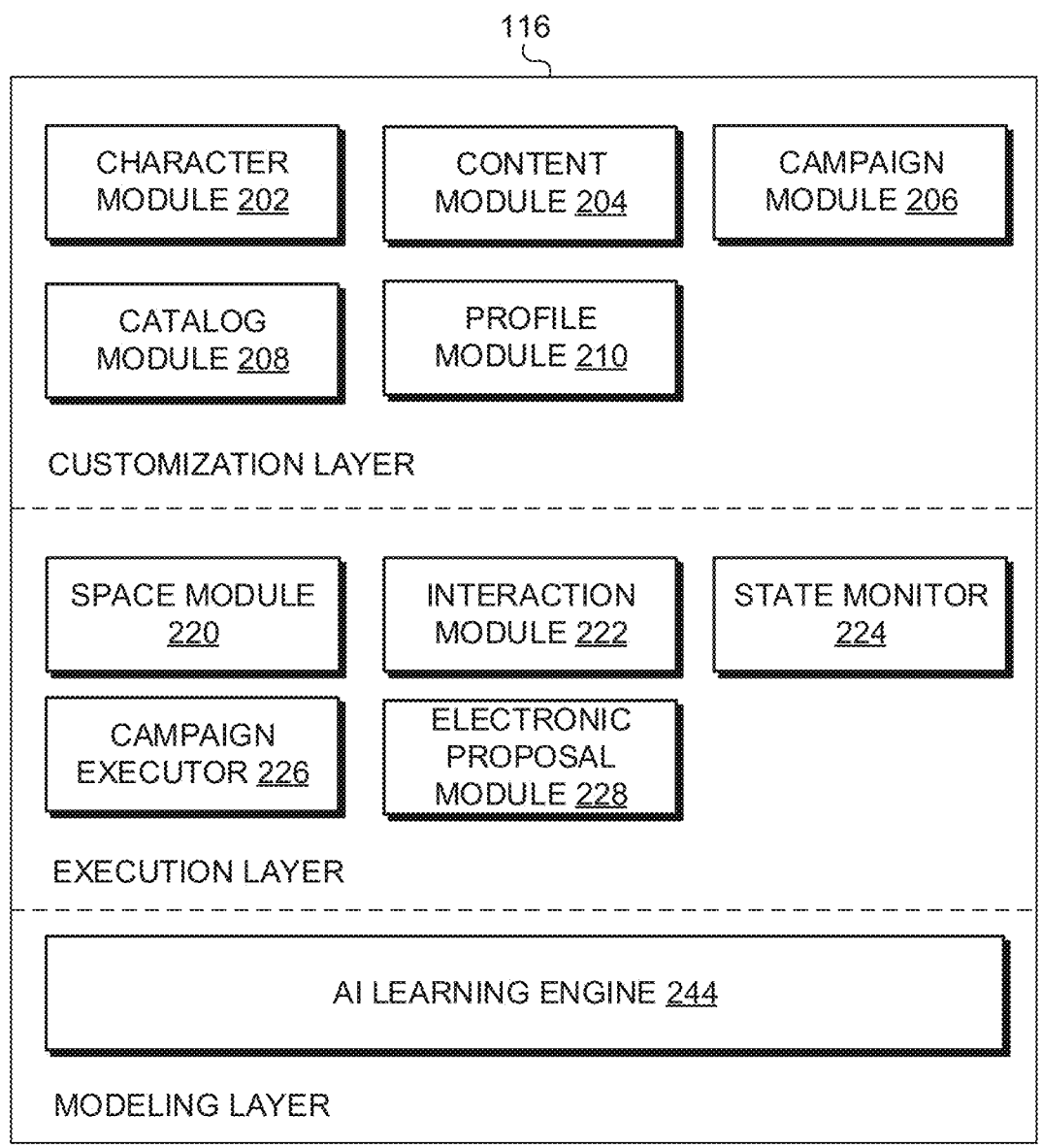
FIG. 2 illustrates a character customization application for creating customized characters and selectively displaying them in an electronic channel, according to an implementation of the invention.

FIG. 2 illustrates a character customization application 116 for creating customized characters and selectively displaying them in an electronic channel, according to an implementation of the invention. Character customization application 116 may include a setup layer, an execution layer, and a modeling layer.

The setup layer may include components used to configure Characters, content, catalogs, campaigns, and profiles. For instance, the setup layer may include a character module 202, a content module 204, a campaign module 206, a catalog module 208, a profile module 210, and/or other components.

Generating Characters

The character module 202 may generate a Character for use in system 100 based on input from a character provider 140. For example, the character module 202 provide a user interface to receive, from the character provider 140, one or more character attributes that each define a property of a character. Other techniques of receiving character attributes from a character provider 140 may be used as well or in addition, such as through the use of an application programming interface (e.g., a Representational State Transfer (REST) API, Simple Object Access Protocol (SOAP) API, etc.).

A given Character may be based on a pre-existing graphic, image, audio, gesture/behavior, and/or text (and oftentimes, but not necessarily, is a well-known graphic, image, audio, gesture/behavior, and/or text associated with or owned by the character provider 140). In other instances, a Character to be generated is based on a newly created set of graphic, image, audio, gesture/behavior, and/or text that is created using system 100.

In some implementations, the character module 202 may provide electronic tools to create a new character properties to create an all-new character this is not based on a pre-existing graphic, image, audio, gesture/behavior, and/or text (other than character templates as described below). In this manner, character providers 140 may design and generate new Characters on-the-fly using the system 100, and others may customize and instantiate the new Characters.

For example, the character module 202 may include conventional drawing tools to create images, as well as various multi-media upload tools for character providers 140 to upload various media to be used as an attribute of a Character. The character module 202 may also provide audio editing tools to enable creation of new or custom audio attributes to be associated with a Character to be created.

In some instances, the character module 202 may further accept links to content stored offsite via a network and retrieve the content for incorporation or association with the Character. For example, the character module 202 may receive (from character providers 140) links to graphics, images, audio, text, and/or other content for incorporation into a Character. In this manner, character providers 140 may create Character off-site and link to them or otherwise upload content for creating a Character.

In some implementations, the character module 202 may access an electronic library of character templates that include graphic, image, audio, gesture/behavior, text, and/or other attribute of a character that can be modified to create a new Character. The electronic library may be stored in a database, such as character database 122. The new Character may then be customized by character customizers 150.

In some instances, the character module 202 may receive permission (e.g., legal permission for relevant intellectual property) from the character provider 140 to use the Character. Upon receipt of the character attributes, the character module 202 may assign the Character with a character identifier (which may be system-generated and/or provided by the character provider 140) and store the character attributes in association with the character identifier in a database, such as character database 122. In some instances, a character provider 140 may specify that any customization must be approved by the character provider. In these instances, the character module 202 may store a flag or other indication in association with the character identifier that indicates that such approval is necessary. As would be apparent, multiple Characters may be created and stored, each based on input from different ones of the character providers 140.

Customizing Characters

One or more of the foregoing character attributes may be customized by a character customizer 150. For instance, the character module 202 may obtain available Characters from the character database 122. The character module 202 may present, to a character customizer 150, a selectable listing of the available Character for customization, display options for inputting one or more customization options (which each enable customization of a corresponding character attribute), and display options for inputting one or more conditions that if satisfied should cause an inputted customization to be applied to a selected Character. The character module 202 may receive a selection of a Character to customize from the character customizer 150, one or more customizations that customize character attributes, and/or one or more conditions. The customization options may each alter an attribute. For instance, a customization option may add or remove a prop or other virtual item from the Character and/or alter other attributes of the Character. Based on the inputted data, the character module 202 may generate one or more customization rules for the Character. As such, the customization rules may specify when a Character and/or customization option for the Character should be instantiated and how the instantiated Character should be presented via a Channel.

If a condition is received, the foregoing customization may be made contingent on satisfaction of the condition. Accordingly, the character module 202 may generate a rule that requires satisfaction of the condition before a Customized Character is instantiated via a Channel. The rule, when triggered, may implement the customizations to the Character such that one or more of the relevant attributes of the Character are customized responsive to satisfaction of the condition.

The foregoing and other customizations may be subject to approval by the character provider 140, as described above. As such, before implementing any of the customizations, the character module 202 may determine whether the flag that indicates customization approval is required is set. If the flag is set, the character module 202 may provide the customizations to the character provider 140 for approval. If an approval indication is received from the character provider 140, then the character module 202 may implement the customizations. If not, the character module 202 will not implement the customizations and inform the character customizer 150 of the non-approval.

In some implementations, an audience (e.g., one or more end users operating or otherwise controlling a user device 130) may select one or more Characters to appear, either persistently, on-demand, and/or responsive to satisfaction of conditions. In these implementations, the end user may control whether and when a character is instantiated on a Channel provided via the user device 130. In some of these implementations, the computer system 110 may transmit instructions to user device 130 to instantiate a given character (with or without customizations) and the user device 130 override such instruction based on the user settings. In some implementations that employ the foregoing user settings, the computer system 110 may identify user devices 130 operated by users that have permitted certain characters to be displayed, and may identify those user devices 130 to receive corresponding characters customized by a character customizer 150.

The content module 204 may obtain and store content for presentation with a Customized Character and/or content that is to act as a condition. Such content may be provided by the character provider 140, the character customizer 150, from a media provider such as a streaming media platform, and/or other source from which content may be obtained. The obtained content may be stored in a database, such as content database 120.

The content may include media (e.g., videos, images, audio, etc.), tactile information (e.g., haptic output), and/or other types of content that can be presented with or serve as a condition for a Character. In some instances, the content may be stored so that a content customizer 150 may specify one or more times of playback of the content that a Customized Character should be instantiated or otherwise appear. In some instances, the one or more times may be tied to specific custom behaviors. For example, content customizer 150 may specify that a customized character should appear in a virtual or augmented display when a video playback is at the one minute mark. Additionally, the content customizer 150 may specify that the Customized Character should exhibit a certain behavior at the two minute mark. In this way, the content customizer 150 may specify specific behaviors or other character properties should occur in association with content obtained and stored by the content module 104.

The campaign module 206 may generate a campaign based on campaign parameters input by a character customizer 150 (or other system user). In some instances, the campaign module 206 may check any permissions that may be required by a character provider 140 for Characters that the character customizer 150 wishes to customize and/or include in a campaign. This may be accomplished by comparing an identity of the character customizer 150 with a list of character customizers that the character provider may have pre-authorized as an agent (as specified in a character provider profile).

The campaign parameters may be stored in a database, such as content database 120. A campaign may include a discreet set of one or more Customized Characters to be presented in association with one or more Conditions described herein. In other words, during a campaign, one or more Characters (some or all of which may be customized) may be presented for instantiation on via a Channel (in some cases if one or more condition have been satisfied). A given campaign may be executed by the system when a campaign initiating event occurs. A campaign initiating event may include an indication from a user to start the campaign, when a predefined time period has elapsed, when the current date meets or exceeds a start date, and/or other configurable time or event. The campaign may be executed until canceled or may expire upon satisfaction of a campaign terminating event. A campaign terminating event may include a predefined time period has elapsed, when the current date meets or exceeds an end date, when a certain number of characters have been instantiated in association with the campaign, and/or other configurable time or event.

The campaign parameters may specify certain conditions that must be met in order for a character to be instantiated in a Channel. For campaigns with more than one Character to be instantiated, the conditions may apply to all the Characters. Alternatively, some conditions may apply some of the Characters while other conditions may apply to other Characters. For example, one Character of a campaign may include a company logo while another Character includes a company product. The company logo and the company product characters may be instantiated when a given condition is satisfied. Alternatively or additionally, the company logo character may be instantiated when one condition is satisfied while the company product character may be instantiated when another condition is satisfied. In this manner, the campaign designer (usually but not necessarily a character customizer 150) may flexibly configure a campaign with multiple Characters.

Examples of programmable conditions may include, without limitation, detection of the presence of a user device 130 at a physical geolocation of the user device (based on on-board GPS or other location sensors), a movement or speed of the user device (based on gyroscopic or other motion sensors), a virtual world state (e.g., of a game or other media playing at the user device), other state of the user device 130, detection of media being played in an environment or surrounding of the user device (e.g., video, audio, videogame) being played external to the user device, an event detected by the user device (e.g., the device is present at a sporting or other event as determined through visual recognition of images from a camera using conventional image recognition techniques), an object, graphics or text detected in an environment of the user device, an ambient condition detected by the user device, and/or other state of the environment or surrounding of the user device.

In some implementations, the system may store and access various campaign templates that include a predefined set of campaign parameters that can be customized and updated. In this manner, a campaign designer may use (or re-use or update/customize) previously used campaign parameters, whether previously used by the campaign designer or other system user (e.g., another campaign designer). The campaign templates may be stored in a database, such as content database.

The catalog module 208 may obtain catalog information and present the catalog information in a user interface for modifying or adding catalog information. The catalog information may include, without limitation, information relating to campaigns (described below), characters (whether customized or not), content, metadata relating to the content, and/or other information stored in a system database (such as databases 120-126).

The profile module 210 may generate various profiles. The profiles may be stored in a database, such as profile database 124. A given profile may include information about a user or entity to which the profile relates. Such information may include, without limitation, identifying information, information specific to the user or entity, account information for the user or entity, and/or other information relating to the user or entity.

The profile module 210 may update the profiles based on activity on the system. For instance, the account information may be used to transfer (e.g., debit or credit) units of value from or to a given account based on usage of the system. The account of an entity such as a character customizer 150 may be debited in exchange for an ability to create campaigns and customize characters. In some instances, the account of any of the foregoing users or entities may be debited based on their usage of the system (e.g., for the opportunity to leverage the system to use or customized characters or content, debited due to a winning bid, etc.). In some instances, the account of any of the foregoing users or entities may be credited based on their usage of the system (e.g., as a reward for using the system or allowing content or characters to be used).

Profile module 210 may generate a character provider profile for a character provider 140. Character provider specific information may include, without limitation, a listing of characters that were provided by the character provider 140, permissions relating to the characters, approvals of customizations made by a character customizer 150, campaigns associated with the character provider (or the characters provided by the character provider), a listing of agents authorized to customize characters and build campaigns on behalf of the character provider, and/or, other information relating to the character provider.

Profile module 210 may generate a character customizer profile for a character customizer 150. Character customizer specific information may include a listing of characters that the character customizer 150 customized and their corresponding customization options, a listing of campaigns associated with the character customizer 150, and/or other information specific to the character customizer.

Profile module 210 may generate a user profile for a user (e.g., who operates user device 130). User-specific information may include, without limitation, preferences that specify particular Characters that the user permits to be instantiated at a Channel, preferences that limit when or how characters may be instantiated, identifying information for a Channel that the user uses, and/or other user-specific information.

The execution layer may include components used to instantiate an electronic interface, facilitate interactions within the electronic interface, monitor state information reflecting activity associated with the electronic interface to determine whether conditions have been satisfied, and model a character based on customizations. For instance, the execution layer may include a space module 220, an interaction module 222, a state monitor 224, and a campaign executor 226.

The space module 220 may be configured to implement the instance of the virtual space executed by the computer modules to determine state of the virtual space. The state may then be communicated (e.g., via streaming visual data, via object/position data, and/or other state information) from computer system 110 to user devices 130 or other Channel for presentation to users. The state determined and transmitted to a given user device 130 or other Channel may correspond to a view for a user character being controlled by a user via the given user device 130 or other Channel. The state determined and transmitted to a given user device 130 or other Channel may correspond to a location in the virtual space. The view described by the state for the given client computing platform may correspond, for example, to the location from which the view is taken, the location the view depicts, and/or other locations, a zoom ratio, a dimensionality of objects, a point-of-view, and/or view parameters of the view. One or more of the view parameters may be selectable by the user.

The instance of the virtual space may comprise a simulated space that is accessible by users via clients (e.g., user devices 130) that present the views of the virtual space to a user. The simulated space may have a topography, express ongoing real-time interaction by one or more users, and/or include one or more objects positioned within the topography that are capable of locomotion within the topography. In some instances, the topography may be a 2-dimensional topography. In other instances, the topography may be a 3-dimensional topography. The topography may include dimensions of the space, and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). The instance executed by the computer modules may be synchronous, asynchronous, and/or semi-synchronous.

The above description of the manner in which state of the virtual space is determined by space module 220 is not intended to be limiting. The space module 220 may be configured to express the virtual space in a more limited, or more rich, manner. For example, views determined for the virtual space representing the state of the instance of the virtual space may be selected from a limited set of graphics depicting an event in a given place within the virtual space. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other expressions of individual places within the virtual space are contemplated.

Within the instance(s) of the virtual space executed by space module 220, users may control objects, simulated physical phenomena (e.g., wind, rain, earthquakes, and/or other phenomena), and/or other elements within the virtual space to interact with the virtual space and/or each other. The user-controlled objects may include avatars. As used herein, the term "user-controlled object" may refer to an object (or group of objects) present in the virtual space that represents an individual user. The user user-controlled object may be controlled by the user with which it is associated. User controlled element(s) may move through and interact with the virtual space (e.g., non-user objects in the virtual space, other objects in the virtual space). The user controlled elements controlled by and/or associated with a given user may be created and/or customized by the given user. The user may have an "inventory" of virtual goods and/or currency that the user can use (e.g., by manipulation of a user character or other user controlled element, and/or other items) within the virtual space.

The users may participate in the instance of the virtual space by controlling one or more of the available user-controlled elements in the virtual space. Control may be exercised through control inputs and/or commands input by the users through user devices 130. The users may interact with each other through communications exchanged within the virtual space. Such communications may include one or more of textual chat, instant messages, private messages, voice communications, and/or other communications. Communications may be received and entered by the users via their respective user devices 130. Communications may be routed to and from the appropriate users through computer system 110 (e.g., through space module 220).

It should be noted that the virtual space may take the form of a virtual reality ("VR") space in which all of the elements of the virtual reality space is a digital representation. In these instances, the customized character may be instantiated in the VR space alongside and interacting with other digital representations. It should be further noted that the character may be integrated into VR programs such that the VR programs themselves instantiate the characters. Thus, third party and other VR program developers may integrate characters into their programs and virtual worlds, such as by accessing an Application Programming Interface exposed by computer system 110 that provides one or more campaign parameters, character attributes or customization options, and/or information that is used to instantiate a character.

In other instances, the virtual space may take the form of an augmented view that is overlaid onto or otherwise displayed alongside a real-world view such as through a display device through which the real-world is viewed (e.g., in the case of AR glasses) or on which the real-world is rendered (e.g., in the case of a smartphone screen that renders a real-world image or video from a camera sensor). In these instances, a character may be instantiated in association with and interacting with a real-world element, which may serve as a conventional AR anchor point. Alternatively or additionally, other augmented (non-real-world) elements may serve as anchor points as well.

The interaction module 222 may be configured to monitor interactions of the users or objects with the virtual space and/or each other within the virtual space. This may include monitoring, for a given user, one or more of times at which the given user is logged in to the virtual space, areas of the virtual space the given user views or interacts with or in, other users the given user interacts with, the nature and/or content of interactions of the given user with other users, activities participated in within the virtual space, level, powers, or skill attained in the virtual space, inventory items obtained in the virtual space, and/or other interactions of the given user with the virtual space and/or other users. Some or all of the information generated by interaction module 222 in monitoring the interactions of the users may be stored to the user profiles managed by user module 222 and/or in another database, such as activity database 126.

At a given time, interaction module 222 may determine a set of users that are currently engaged with the virtual space and/or a set of users that are currently not engaged with the virtual space. Being engaged with the virtual space may refer to being logged in to the virtual space, performing some action or interaction within the virtual space within some period of time (e.g., the last 2 minutes), and/or other taking some other action indicating ongoing and contemporaneous engagement with the virtual space.

The interaction module 222 may be configured to determine, for individual users, an activity metric that indicates an activity level within the virtual space. The activity metric may be determined based on one or more of log in frequency, amount of time logged in to the virtual space within a rolling time period (e.g., over the last day, week, month, or other rolling time period), average amount of time logged in to the virtual space over some length of time (e.g., per day, per week, and/or other length of time), average log in session time over a rolling time period, number of inter-user communications over a length of time, number of inter-user communications per log in, number of relationships with other users in the virtual space, number of new relationships with other users in the virtual space within a rolling time period, amount of real world money spent in the virtual space, and/or other activity parameters.

The state monitor 224 may obtain one or more state parameters of a user device 130 that provides the electronic display. For example, user device 130 may provide the state parameters to the state monitor 224. In implementations in which state monitor 224 executes at the user device, the state monitor 224 may be coupled to sensors of the user device 130 via an internal communication interface and/or via one or more processors of the user device 130.

The state parameters may include internal state parameters and external state parameters. Internal state parameters indicate a state of the user device 130. For example, internal state parameters may include, without limitation, a physical geolocation of the user device (based on on-board GPS or other location sensors), a movement or speed of the user device (based on gyroscopic or other motion sensors), a virtual world state (e.g., of a game or other media playing at the user device), and/or other state of the user device 130.

External state parameters may indicate a state of an environment or surrounding of the user device 130. For example, an external state parameter may include, without limitation, media (e.g., video, audio, videogame) being played external to the user device as detected by an input device of the user device (e.g., a camera of the user device 130 may detect visual media from an external display or a microphone of the user device 130 may detect audio from an external speaker), an event detected by the user device 130 (e.g., the device is present at a sporting or other event as determined through visual recognition of images from a camera using conventional image recognition techniques), an object, graphics or text detected in an environment, an ambient condition detected by the user device 130 (e.g., a thermometer of the user device may detect an ambient temperature), and/or other state of the environment or surrounding of the user device.

In an implementation, the state monitor 224 may assess whether or not a monitored state satisfies a condition. For example, the state monitor 224 may monitor the states of a plurality of user devices 130 (or just the user device 130 if the state monitor 224 executes at the user device 130) and determine which ones of the user devices 130 have states that satisfy a condition. The state monitor 224 may identify user devices 130 having states that satisfy a condition for a customized character.

The campaign executor 226 may identify active campaigns and their associated Customized Characters and conditions. Active campaigns may be identified based on a current date falling after a campaign start date and before a campaign end date, based on a current number of impressions of the campaign (i.e., number of times that a character associated with the campaign has been instantiated) being less than a maximum number, and/or other ways to identify active (i.e., non-expired) campaigns.

Using outputs of the state monitor 224, the campaign executor 226 may identify user devices 130 having states that satisfy conditions for customized characters of one or more of the active campaigns. The campaign executor 226 may provide the relevant Customized Characters for instantiation at the identified user devices 130. For example, the campaign executor 226 may provide the identity of the Character and one or more customization options for the Character. The user devices 130 may each instantiate the customized characters based on the identity of the character and one or more customization options from the campaign executor 226.

In some implementations, the campaign executor 226 may push characters to all devices that satisfy conditions. In some implementations, the campaign executor 226 may push Characters to only user devices 130 that have permitted/selected those Characters. It should be noted that pushed Characters need not be in real-time. Rather, the campaign executor 226 may provide Customized Characters to user devices 130 in advance, along with their conditions so that the user device 130 may decide whether to instantiate the Customized Characters. Alternatively or additionally, the campaign executor 226 (or other system component) may periodically receive state parameters from user devices 130, assess the state of the user devices 130 based on the state parameters, and make condition satisfaction decisions in real-time based on the state parameters.

The modeling layer may include components used to model behavior or user interactions with the system. For instance, the modeling layer may include an AI learning engine 244 that observes correlations between variables and outcomes, generate hypotheses of new correlations between variables and outcomes based on the observed correlations, test the hypotheses to determine whether predicted outcomes actually occur, and add the hypothetical correlations to the observed correlations if they do. For example, the AI learning engine 244 may observe that users have strong interactions (e.g., based on length of time of engagement) with instantiated Characters when a particular product is nearby. The AI learning engine 244 may form a hypothesis that a complementary product would also elicit such strong interaction and may test such a hypothesis by causing the Character to be instantiated when the complementary product is also detected. Based on the strength of interaction, the AI learning engine 244 may predict and learn a new affinity between an instantiated Character and a product. Other types of correlations may be observed and predicted as well based on activity on the system. In this manner, the AI learning engine 244 may enable character customizers to tailor customizations and conditions based on predicted correlations from the AI learning engine 244.

Figure 3:
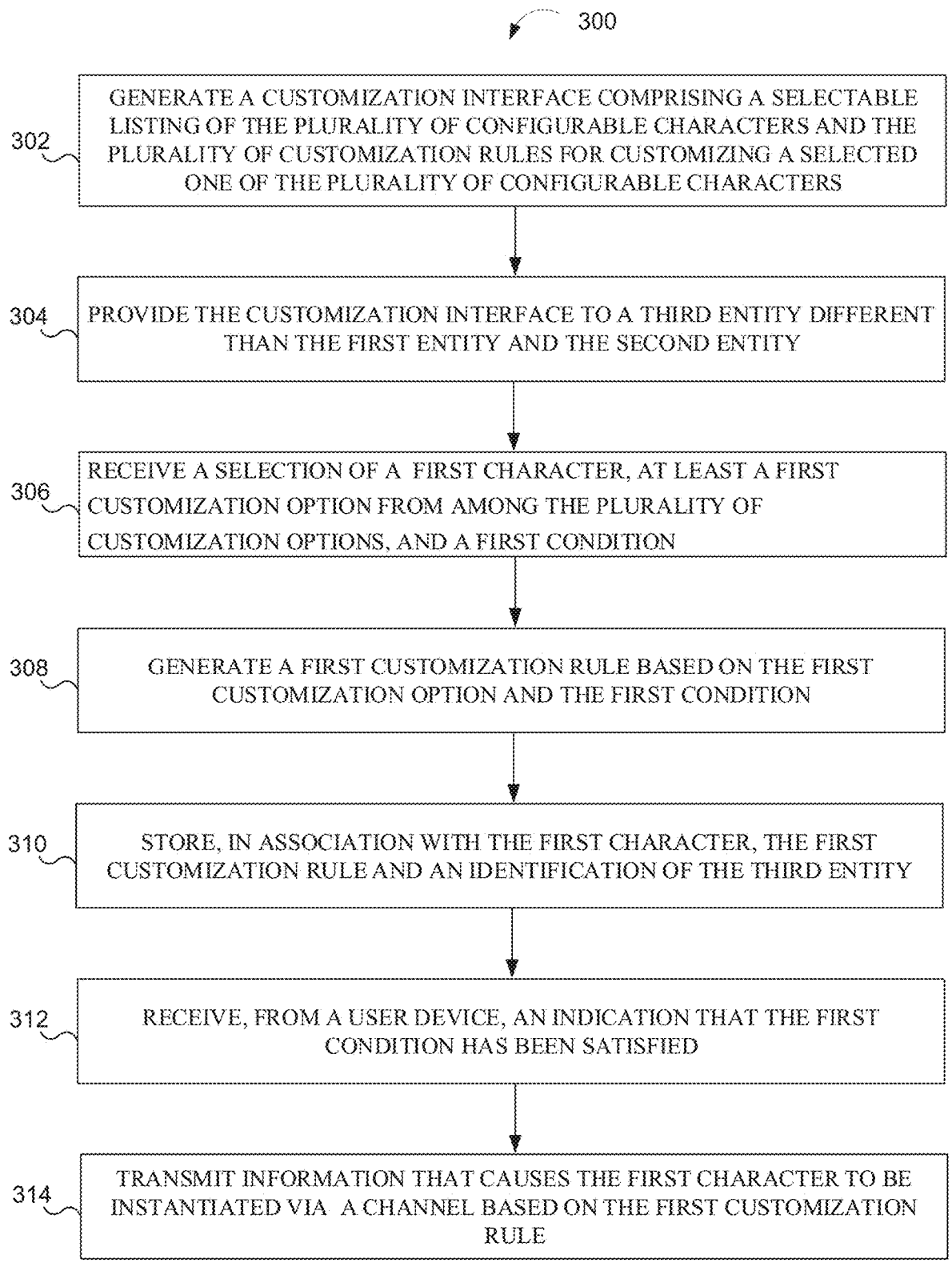
FIG. 3 depicts a process of creating electronic characters, selectively modifying the characters, and presenting them via electronic channels in response to satisfaction of specified conditions, according to an implementation of the invention.

FIG. 3 depicts a process of creating electronic characters, selectively modifying the characters, and presenting them via electronic channels in response to satisfaction of specified conditions, according to an implementation of the invention.

In an operation 302, process 300 may include generating a customization interface comprising a selectable listing of the plurality of configurable Characters and a plurality of customization options for customizing a selected one of the plurality of configurable electronic characters.

In an operation 304, process 300 may include providing the customization interface to a third entity different than the first entity and the second entity.

In an operation 306, process 300 may include receiving, from the third entity, a selection of the first Character, at least a first customization option from among the plurality of customization options, and a first condition that, upon satisfaction, causes the first Character to be customized according to the first customization option.

In an operation 308, process 300 may include generating a first customization rule based on the first customization option and the first condition.

In an operation 310, process 300 may include storing, in association with the first Character, the first customization rule and an identification of the third entity.

In an operation 312, process 300 may include receiving, from a user device, an indication that the first condition has been satisfied.

In an operation 314, process 300 may include transmitting information that causes the first electronic character to be instantiated on a Channel (e.g., the user device) and causes the first Character to exhibit the behavior or content specified by the first customization rule on the electronic display.

Figure 4:
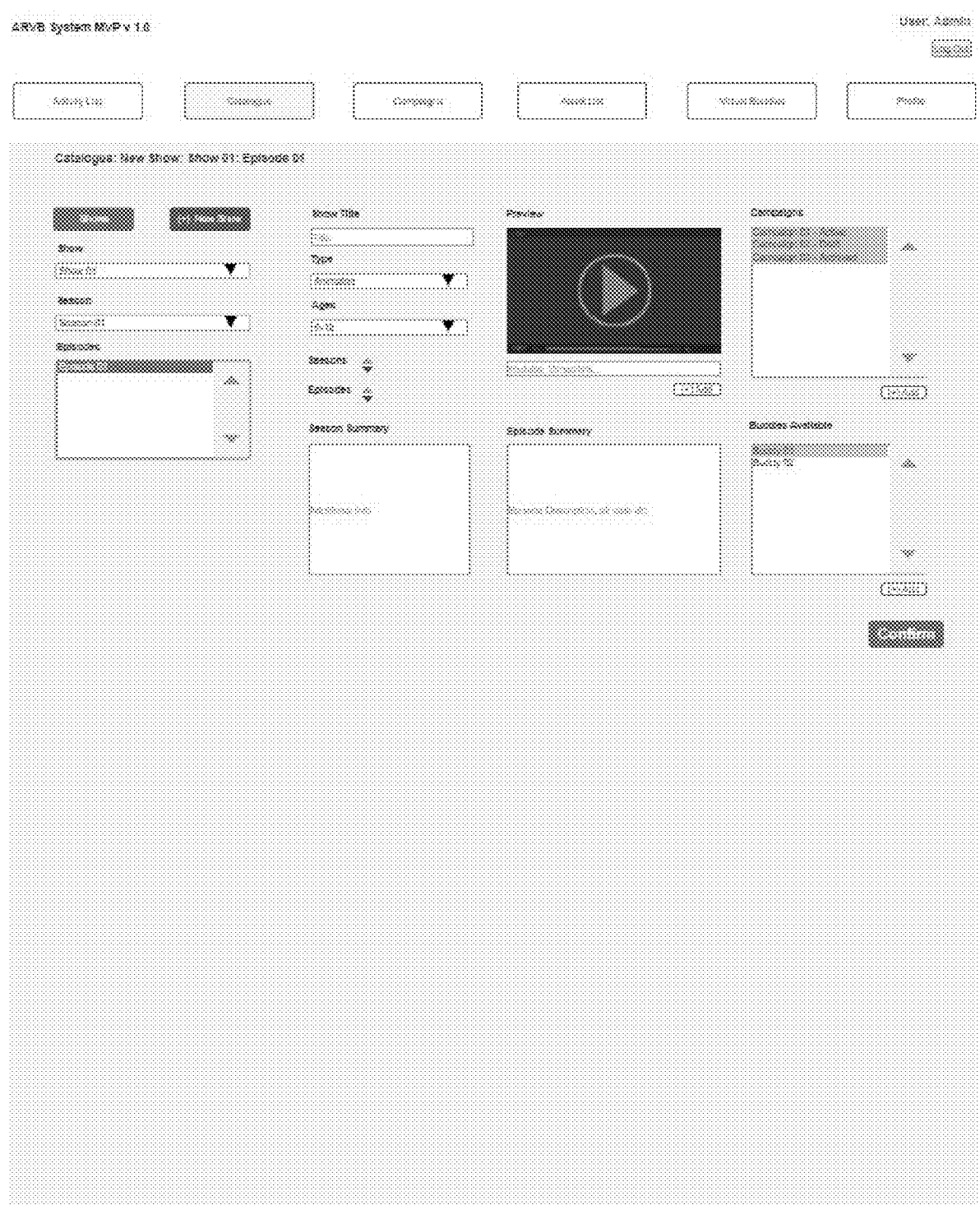
FIG. 4 depicts a user interface for displaying and interfacing with catalogs, according to an implementation of the invention.

FIG. 4 depicts a user interface 400 for displaying and interfacing with catalogs, according to an implementation of the invention. A catalog may provide a listing of available content (e.g., television shows) and corresponding metadata about the content (e.g., show identifiers, season identifiers, category of shows, intended audience, season summaries, episode summaries, previews of the shows, campaigns associated with the shows, available Characters, etc.). Furthermore, user interface 400 may include various input mechanisms to add one or more of the foregoing items to the catalog. In this manner, one or more campaigns may be managed in the context of content (such as shows) that trigger Customized Characters to be instantiated. As such, catalogs may show high-level view of and interaction with content, campaigns, and characters that have been linked together.

Figure 5:
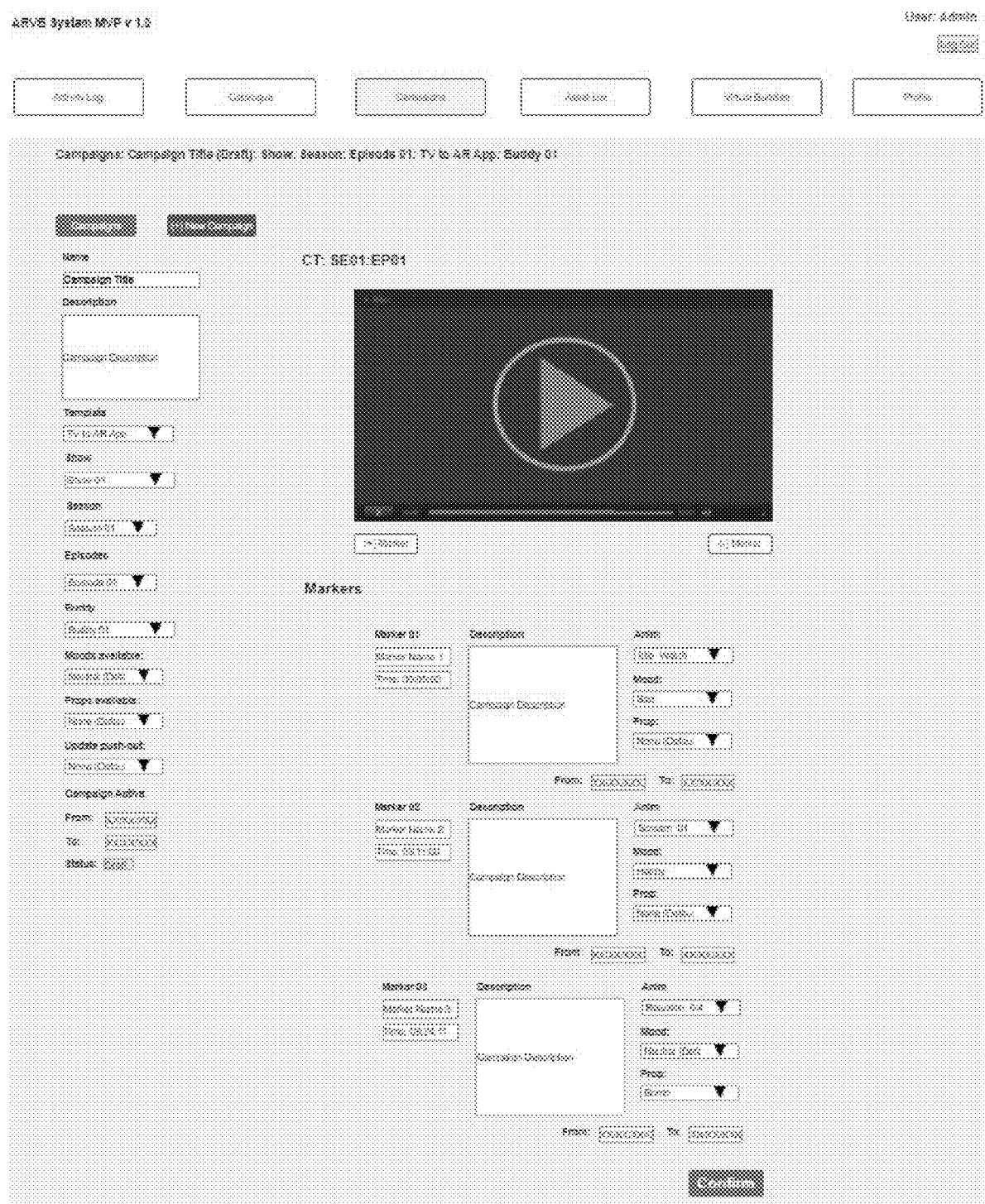
FIG. 5 depicts a user interface for displaying and interfacing with campaigns, according to an implementation of the invention.

FIG. 5 depicts a user interface 500 for displaying and interfacing with campaigns, according to an implementation of the invention. Campaigns may each run for a period of time and define when and how the system will cause Customized Characters to be triggered and instantiated via Channels. The user interface 500 may, for example, include a display options for showing, updating, or creating campaign parameters for an existing campaign and/or to create a new campaign. For example, the user interface may include display options for a campaign title, campaign template selection, associated content and characters used in the campaign, campaign starting and ending events, and creation of markers.

As previously described, a Character may be instantiated and/or caused to exhibit custom properties at various times of playback of media content. The user interface 500 may include display options for configuring such times through the creation of markers. For instance, a given marker may be associated with a marker name, a time of media playback that starts the marker, a character that should be instantiated, as well as attributes of the character that should be exhibited. It should be noted that a given attribute may be predefined or updated using user interface 500 for a given marker.

User interface 500 may also include a media playback display option that shows a view of how a campaign would be rendered by a user device 150. In other words, the media playback display option may show how the Customized Character(s) will be instantiated in association with video playback so that the campaign designer can view how a given campaign will appear to an end user. In instances that require approval by the character provider 140, the media playback display option may be displayed to (or the contents sent to) the character provider for approval.

Figure 6:
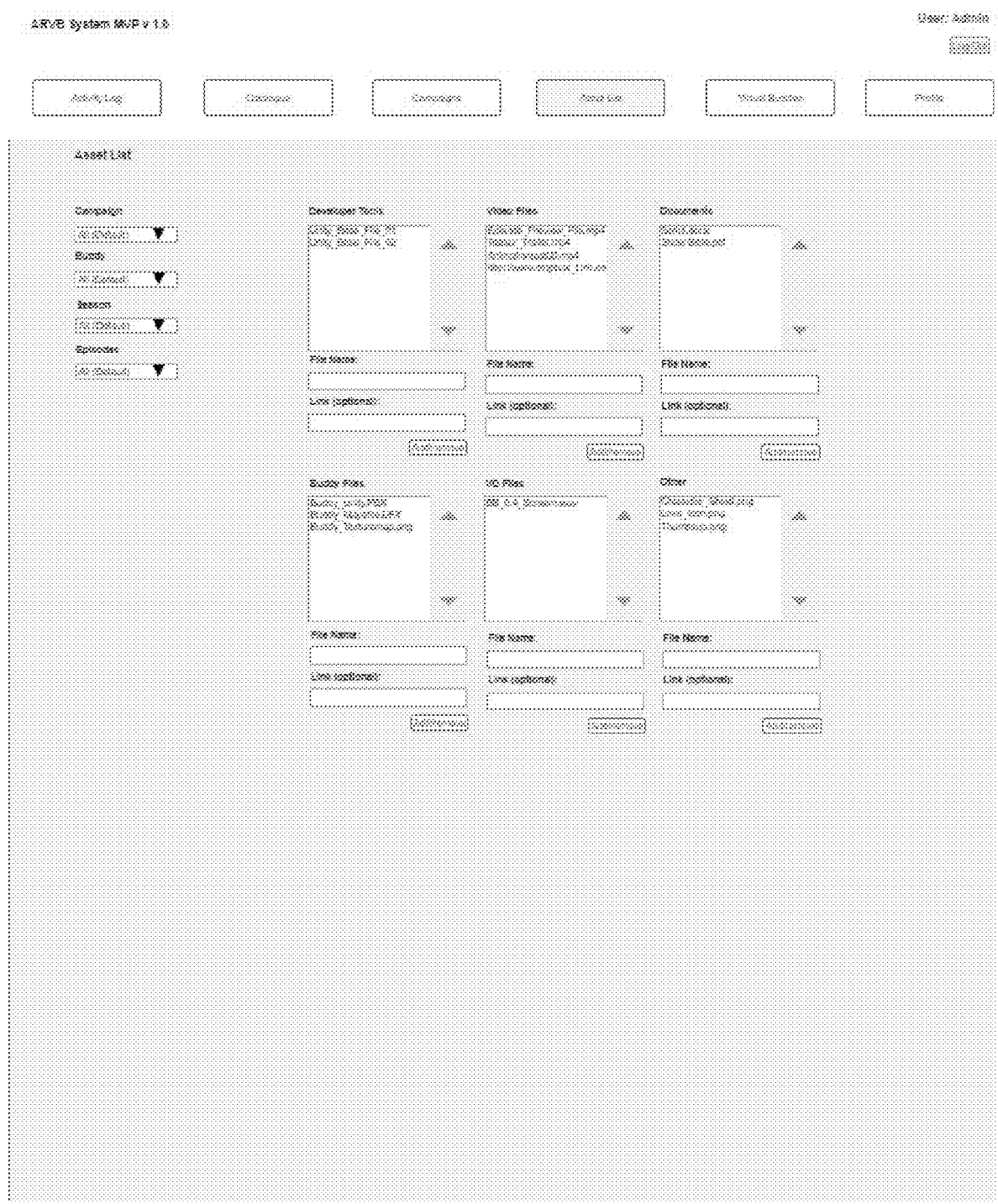
FIG. 6 depicts a user interface for displaying and interfacing with content, according to an implementation of the invention.

FIG. 6 depicts a user interface 600 for displaying and interfacing with content, according to an implementation of the invention. User interface 600 may provide an asset list of available assets (such as content and tools) for use or incorporation into a campaign or to create Characters. For example, the user interface 600 may include selectable display options to select campaigns and associated assets, Characters, show or other media, developer tools such as game development platform files (e.g., UNITY development platform files), character property files (e.g., video files, documents, audio files, image files, etc.), and/or other assets that may be used to create or customize a campaign and/or a Character.

Figure 7:
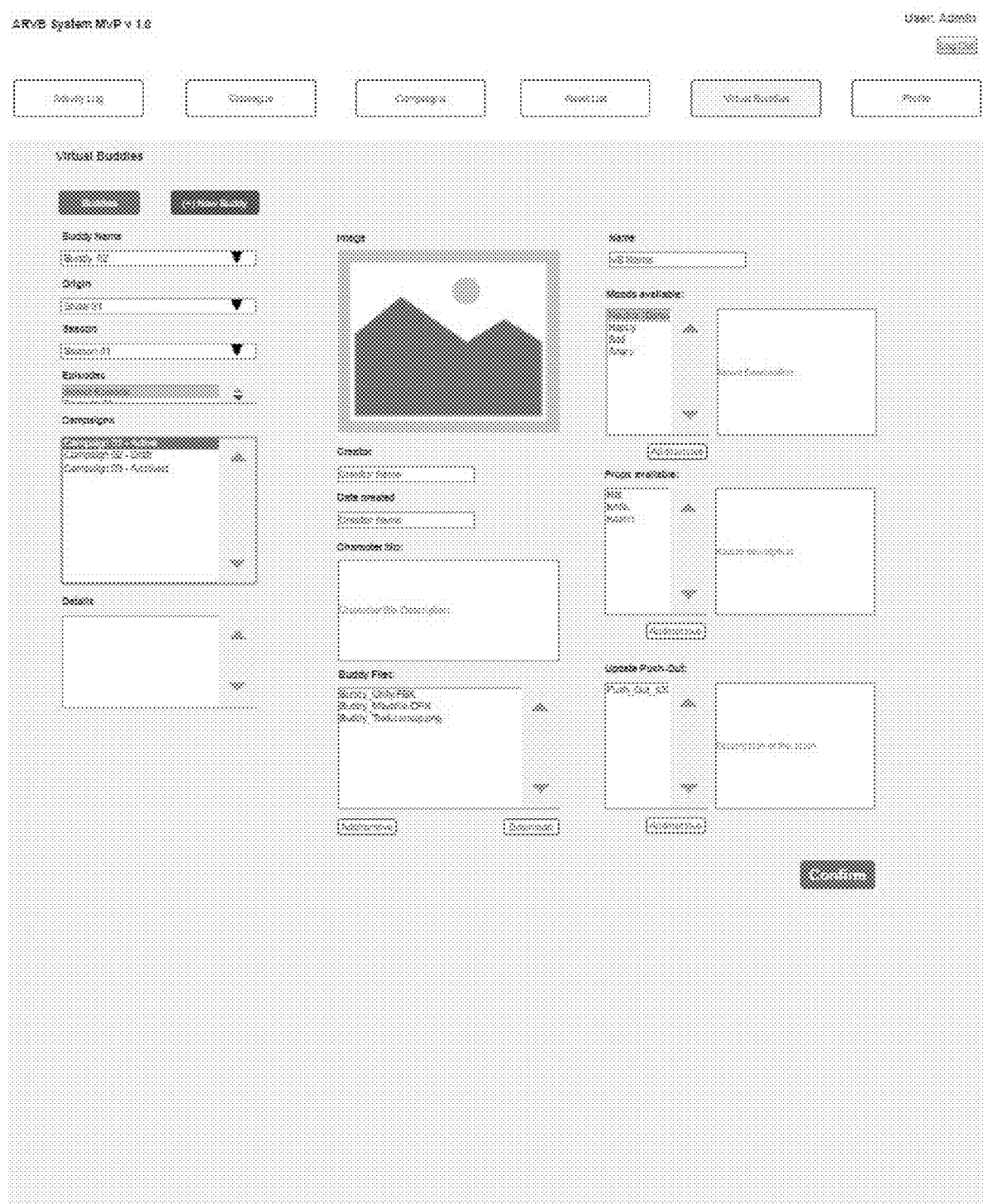
FIG. 7 depicts a user interface for displaying and interfacing with electronic characters, according to an implementation of the invention.

FIG. 7 depicts a user interface 700 for displaying and interfacing with electronic characters, according to an implementation of the invention. User interface 700 may be used to view, create, or customize Characters. For instance, user interface 700 may include display options for a character name, origin (e.g., the original show or other content that the character has been associated with), campaigns that use the Character, character details (e.g., freeform text that is used to describe a character), image viewer, associated character files, available properties such as customizable moods, available properties, update initiation (to push updates to the character to user devices 150), and/or other display options to create or customize a character.

Figure 8:
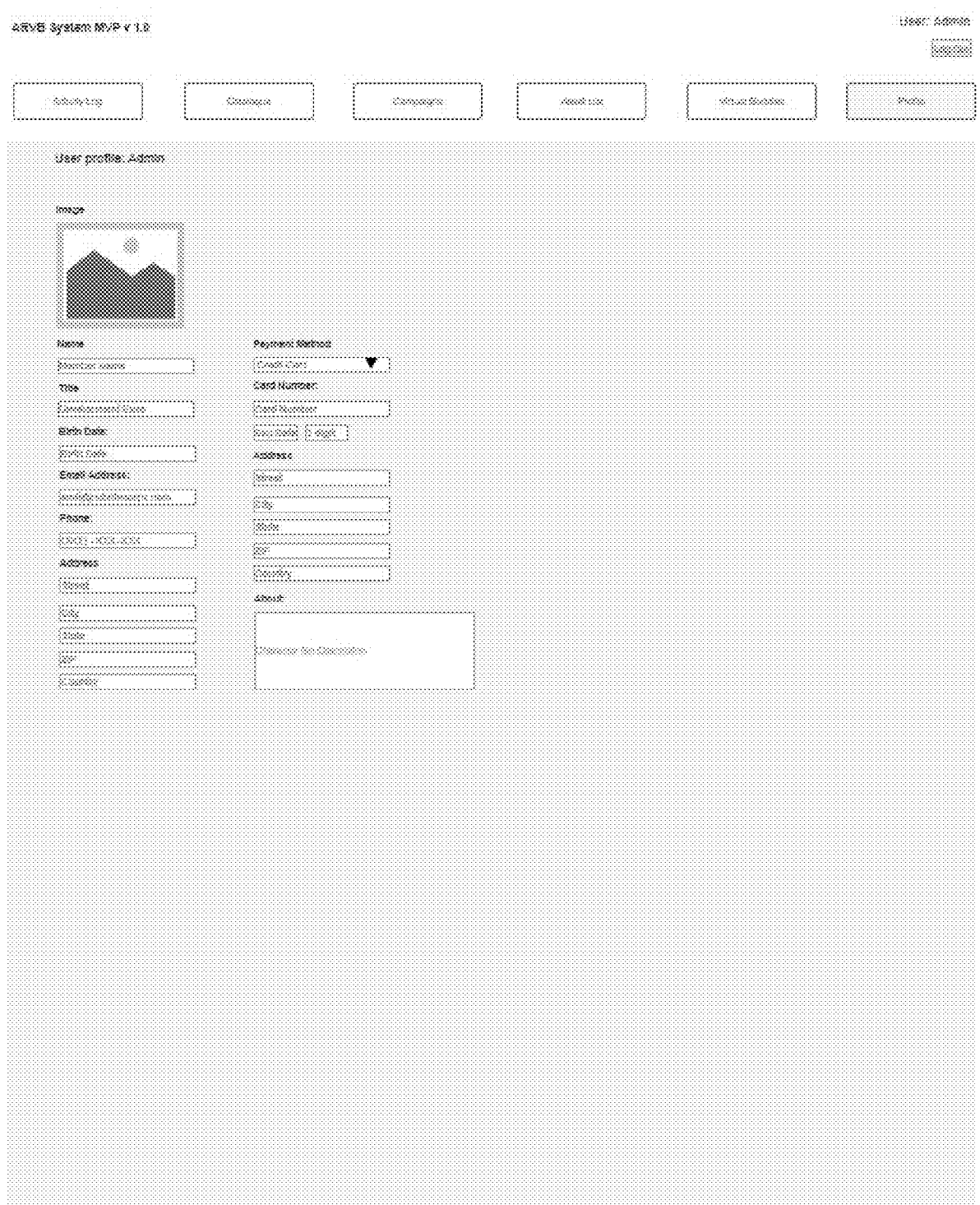
FIG. 8 depicts a user interface for displaying and interfacing with profiles, according to an implementation of the invention.

FIG. 8 depicts a user interface 800 for displaying and interfacing with profiles, according to an implementation of the invention. User interface 800 may be used to create or update profiles, whether for an entity or other system user. A given profile may include profile information that can be entered or updated. Such profile information may include, without limitation, an image, a name, a title, a birth date (where the user is an individual), contact information, payment methods (e.g., to pay for use of the system), and/or other information about the entity.

Figure 9:
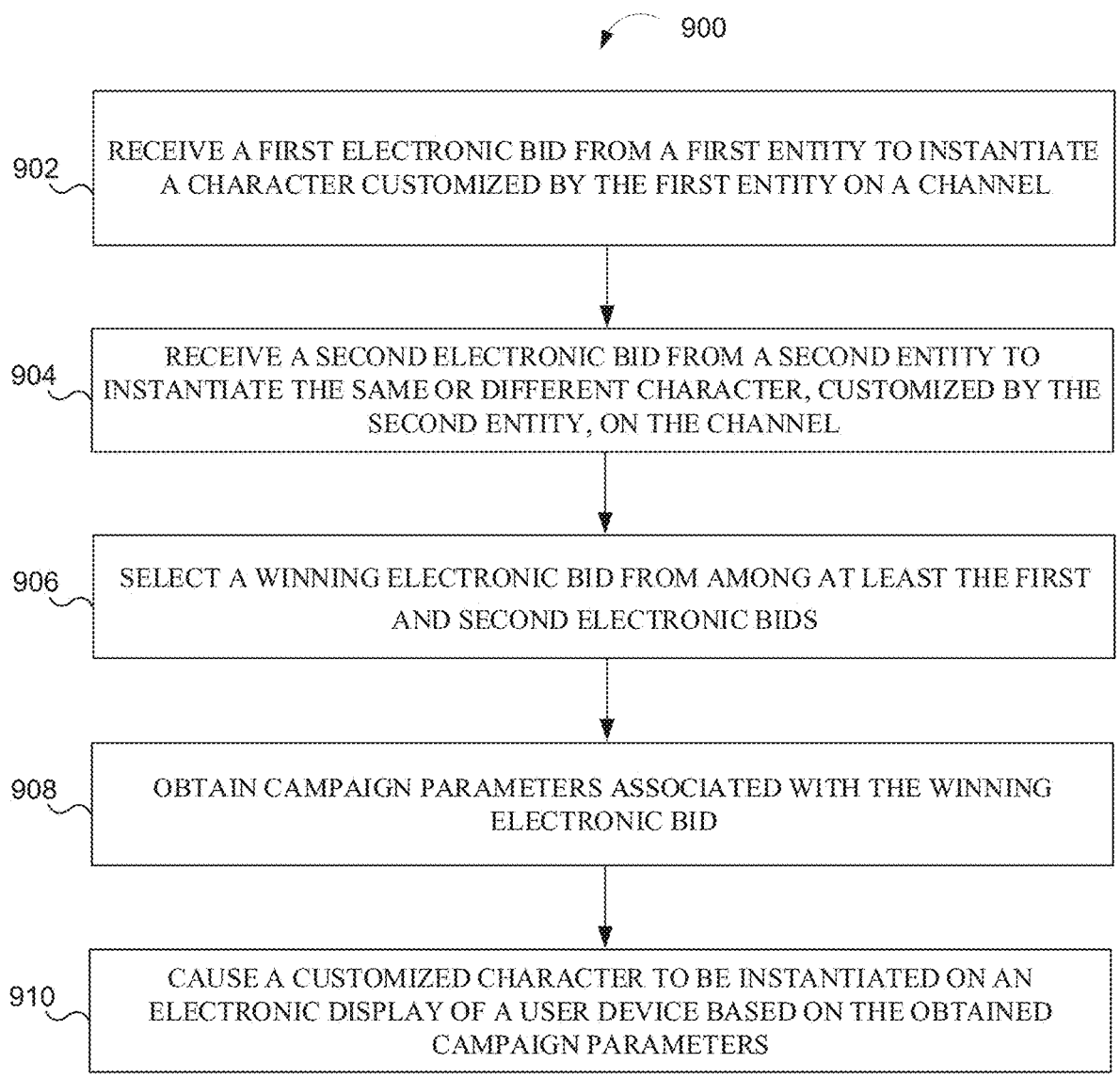
FIG. 9 depicts a process of receiving and selecting electronic bids to customize characters on electronic channels, according to an implementation of the invention.

FIG. 9 depicts a process 900 of receiving and selecting electronic bids to customize characters on electronic displays, according to an implementation of the invention. It should be noted that the operations of FIG. 9 may occur after or in conjunction with creating a campaign. In other words, a given entity (such as a character customizer 150 or other system user) may use the system to generate character customizations and submit an electronic bid to have such customizations instantiated on Channels in a given session or may generate customizations and then separately submit electronic bids to have those customizations instantiated.

In an operation 902, process 900 may include receiving a first electronic bid from a first entity to instantiate a character customized by the first entity on a Channel.

In an operation 904, process 900 may include receiving a second electronic bid from a second entity to instantiate the same or different character, customized by the second entity, on a Channel.

In an operation 906, process 900 may include selecting a winning electronic bid from among at least the first and second electronic bids. Other electronic bids may be considered as well, and more than one winning electronic bid may be selected. The winning proposal may be based on a bid price, a relevance indication, and/or other conventional electronic bid selection processes.

In an operation 908, process 900 may include obtaining campaign parameters (e.g., character customizations) associated with the winning electronic bid. For example, a given set of campaign parameters may be stored in a database in association with an electronic bid.

In an operation 910, process 900 may include causing a Customized Character to be instantiated on a Channel based on the obtained campaign parameters.

Figure 10:
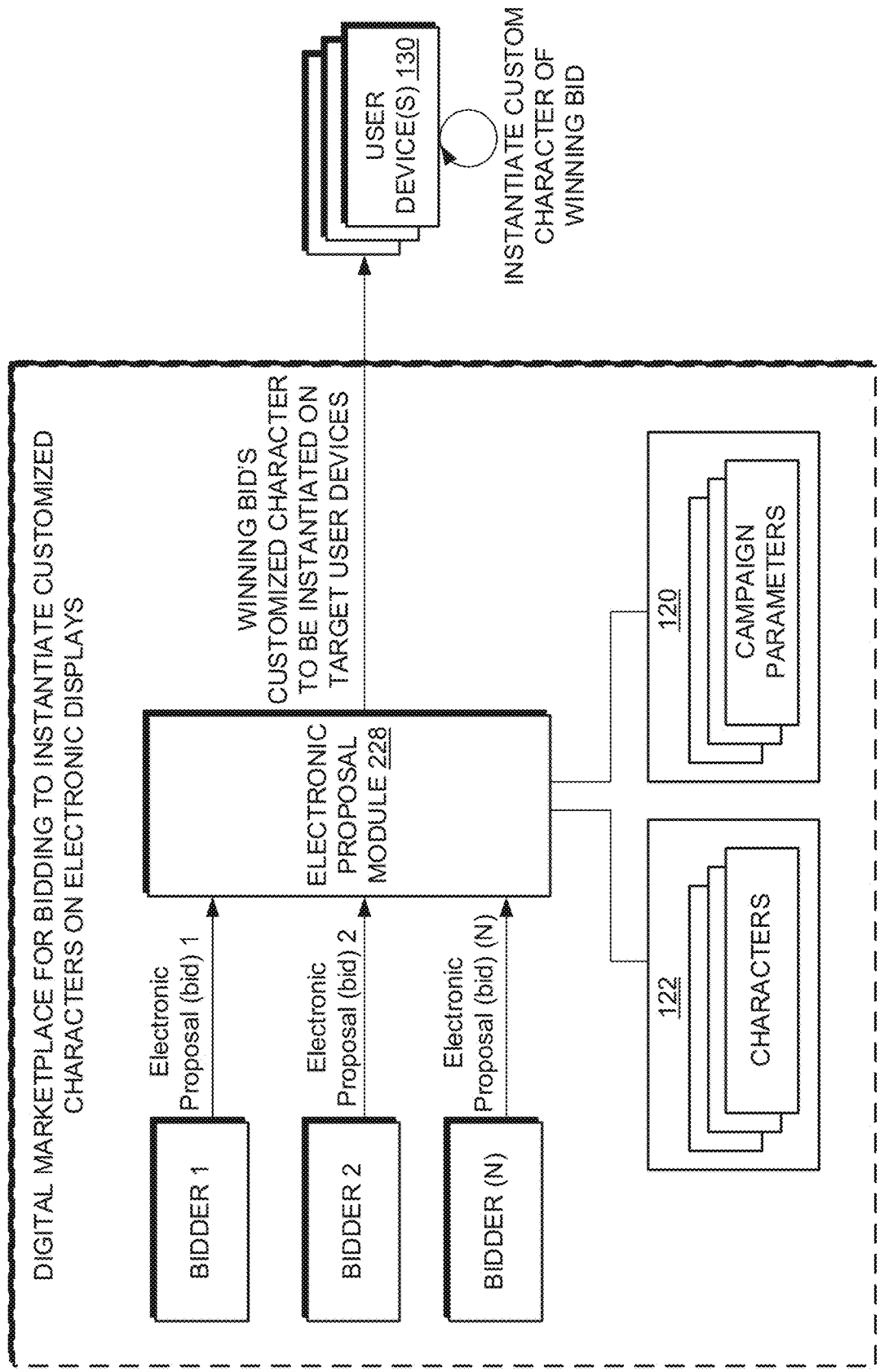
FIG. 10 depicts a digital marketplace for bidding to instantiate customized characters on electronic channels, according to an implementation of the invention.

FIG. 10 depicts a digital marketplace for bidding to instantiate customized characters on electronic channels, according to an implementation of the invention. In an implementation, electronic proposal module 228 may create an electronic marketplace for auctioning opportunities to instantiate custom characters on user devices 130. One or more bidders (illustrated as bidders 1, 2, . . . (N)) may bid on such opportunities by submitting electronic bids (e.g., bids illustrated as Electronic bid 1, 2, . . . (N)). The bidders may include character customizers 150 or other system user. Each bidder may submit one or more of such bids. Such proposals may be received by the electronic proposal module 228 via a webservice (e.g., SOAP service), by modifying a profile of the bidder, and/or other electronic methods to receive a bid.

A winning bid may be associated with character customizations that are to be instantiated on the Channels. Such character customizations may be obtained from one or more campaign parameters that were previously, or in conjunction with the bidding process, defined by a bidder.

The electronic proposal module 228 may receive state information of each user device 130 or other Channel, and may determine that a condition associated with one or more of the bids has been satisfied. In response to such determination, the electronic proposal module 228 may conduct an auction to determine a winning bid. Such auction may simply obtain pre-stored bids and/or may poll various bidders to elicit real-time bids. The auction may be conducted in real-time (such as when a user device is at a particular location or otherwise has satisfied a condition). The result of the auction is that one or more bids is selected according to conventional electronic auction processing, and a corresponding customized character may be instantiated on the user device(s) 130 that satisfied the condition.

The AI learning engine 244 (referring to FIG. 2) may monitor the interactions each of the users of each of the user device(s) 130 to determine a level of interaction with the Customized Character. Such monitoring may be used to model interaction patterns, as previously noted. In some instances, the level of interaction may be fed back to the electronic proposal module 228, which performs usage analytics for the marketplace. For example, in some instances, a fee structure for the winning bidder may be based on the level of interaction. For example, if a customization included an instantiated character virtually holding a product, with further calls to action (e.g., to obtain further information on the product or purchase the product), then the fee structure for the winning bidder may be based on whether the user acted on the call to action. The electronic proposal module 228 may therefore implement a cost per instantiation model, a cost per interaction model, a cost per purchase model, and/or other fee structure charged to the winning bidder for having that winning bidder's customizations be instantiated on user displays.

Although illustrated in FIG. 1 as a single component, computer system 110 and user device 130 may each include a plurality of individual components (e.g., computer devices) each programmed with at least some of the functions described herein. In this manner, some components of computer system 110 and/or user device 130 may perform some functions while other components may perform other functions, as would be appreciated. The one or more processors 112 may each include one or more physical processors that are programmed by computer program instructions. The various instructions described herein are exemplary only. Other configurations and numbers of instructions may be used, so long as the processor(s) 112 are programmed to perform the functions described herein.

Furthermore, it should be appreciated that although the various instructions are illustrated in FIG. 1 as being co-located within a single processing unit, in implementations in which processor(s) 112 includes multiple processing units, one or more instructions may be executed remotely from the other instructions.

The description of the functionality provided by the different instructions described herein is for illustrative purposes, and is not intended to be limiting, as any of instructions may provide more or less functionality than is described. For example, one or more of the instructions may be eliminated, and some or all of its functionality may be provided by other ones of the instructions. As another example, processor(s) 112 may be programmed by one or more additional instructions that may perform some or all of the functionality attributed herein to one of the instructions.

The various instructions described herein may be stored in a storage device 114, which may comprise random access memory (RAM), read only memory (ROM), and/or other memory. The storage device may store the computer program instructions (e.g., the aforementioned instructions) to be executed by processor 112 as well as data that may be manipulated by processor 112. The storage device may comprise floppy disks, hard disks, optical disks, tapes, or other storage media for storing computer-executable instructions and/or data.

The various databases 120-126 described herein may be, include, or interface to, for example, an Oracle™ relational database sold commercially by Oracle Corporation. Other databases, such as Informix™, DB2 (Database 2) or other data storage, including file-based, or query formats, platforms, or resources such as OLAP (On Line Analytical Processing), SQL (Structured Query Language), a SAN (storage area network), Microsoft Access™ or others may also be used, incorporated, or accessed. The database may comprise one or more such databases that reside in one or more physical devices and in one or more physical locations. The database may store a plurality of types of data and/or files and associated data or file descriptions, administrative information, or any other data.

The various components illustrated in FIG. 1 may be coupled to at least one other component via a network 102, which may include any one or more of, for instance, the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network. In FIG. 1, as well as in other drawing Figures, different numbers of entities than those depicted may be used. Furthermore, according to various implementations, the components described herein may be implemented in hardware and/or software that configure hardware.

The various processing operations and/or data flows depicted in FIG. 3 (and in the other drawing figures) are described in greater detail herein. The described operations may be accomplished using some or all of the system components described in detail above and, in some implementations, various operations may be performed in different sequences and various operations may be omitted. Additional operations may be performed along with some or all of the operations shown in the depicted flow diagrams. One or more operations may be performed simultaneously. Accordingly, the operations as illustrated (and described in greater detail below) are exemplary by nature and, as such, should not be viewed as limiting.

Other implementations, uses and advantages of the invention will be apparent to those skilled in the art from consideration of the specification and practice of the invention disclosed herein. The specification should be considered exemplary only, and the scope of the invention is accordingly intended to be limited only by the following claims.

What is claimed is:

1. A system of storing, programming, and instantiating configurable electronic characters on electronic channels, the system comprising:
a computer system comprising:
a storage device that stores a plurality of configurable electronic characters each received from a third party entity, the plurality of configurable electronic characters comprising at least a first electronic character from a first entity and a second electronic character from a second entity, wherein each electronic character is programmable by one or more of a plurality of customization rules that specify a custom behavior or content of each electronic character upon instantiation;
one or more physical processors programmed by computer program instructions that, when executed, cause the computer system to:

generate a customization interface comprising a selectable listing of the plurality of configurable electronic characters and a plurality of customization options for customizing a selected one of the plurality of configurable electronic characters;

provide the customization interface to a third entity different than the first entity and the second entity;

receive, from the third entity, a selection of the first electronic character, at least a first customization option from among the plurality of customization options, and a first condition that, upon satisfaction, causes the first electronic character to be customized according to the first customization option;

generate a first customization rule based on the first customization option and the first condition;

store, in association with the first electronic character, the first customization rule and an identification of the third entity;

receive, from a user device, an indication that the first condition has been satisfied; and transmit, to the user device, information that causes the first electronic character to be instantiated via the user device and causes the first electronic character to exhibit the behavior or content specified by the first customization rule.

2. The system of claim 1, wherein the user device provides an augmented reality display, and wherein the electronic character is instantiated in the augmented reality display based on an anchor recognized in a real-world environment.

3. The system of claim 1, wherein the user device provides a virtual reality display, and wherein the electronic character is instantiated in the virtual reality display based on a position relative to another virtual reality element.

4. The system of claim 1, wherein the computer system is further programmed to:

receive, from the first entity, a default character attribute that defines a default property of the electronic character, wherein the first customization option customizes the default property.

5. The system of claim 4, wherein the default character attribute defines a default behavior of the electronic character.

6. The system of claim 4, wherein the default character attribute defines a default personality of the electronic character.

7. The system of claim 4, wherein the default character attribute defines a default appearance of the electronic character.

8. The system of claim 1, wherein the first customization option comprises a digital representation of an additional object to be added to an appearance of the electronic character.

9. The system of claim 1, wherein the computer system is further programmed to:

receive an indication from the first entity that customizations to the electronic character must be approved by the first entity;

generate a request to approve the first customization rule and/or the first customization option; and transmit the request to the first entity.

10. The system of claim 1, wherein the first condition comprises a requirement that the user device is at a geolocation.

11. The system of claim 1, wherein the first condition comprises a requirement that a user-controlled object within a virtual world is at a virtual location within the virtual world.

12. The system of claim 1, wherein the first condition comprises a requirement that the user device is at a recognized event.

13. The system of claim 1, wherein the first condition comprises a requirement that a media content playing in the real-world is recognized.

14. The system of claim 13, wherein the media content comprises audio without video.

15. The system of claim 13, wherein the media content comprises video.

16. The system of claim 15, wherein the first condition comprises a requirement that a particular playback time has been achieved in the video.

17. The system of claim 13, wherein the media content comprises a video game.

18. The system of claim 17, wherein the first condition comprises a requirement that a particular level has been achieved or is based on in-game state of the video game.

19. The system of claim 18, wherein the computer system is further programmed to:

obtain a plurality of campaigns, each including at least a campaign initiating event, a campaign terminating event;

determine that a campaign that is associated with the electronic character and the first customization rule is to be executed based on the campaign initiating event and the campaign terminating event; and execute the campaign, wherein a plurality of user devices, including the user device, are monitored to determine whether the first condition of the first customization rule has been met by any one of the plurality of user devices, and wherein the indication is received from the user device based on the monitored devices.

20. The system of claim 1, further comprising the user device, which is programmed to: instantiate an electronic interface;

receive, from the computer system, the first customization rule and an indication to instantiate the electronic character using the first customization rule; and instantiate the electronic character in the electronic interface responsive to receipt of the first customization rule and the indication to instantiate the electronic character.

21. The system of claim 1, wherein the first entity has ownership rights over the first electronic character, and wherein the customization interface enables the third entity to customize the first electronic character and propagate the first electronic character to users via an electronic channel.

* * * * *